March 26, 1946.  H. H. PLATT  2,397,154
ROTATIVE-WINGED AIRCRAFT
Filed Feb. 4, 1941  3 Sheets-Sheet 1

INVENTOR.
Haviland H. Platt
BY Leonard L. Kalish
ATTORNEY

March 26, 1946.  H. H. PLATT  2,397,154
ROTATIVE-WINGED AIRCRAFT
Filed Feb. 4, 1941  3 Sheets-Sheet 3
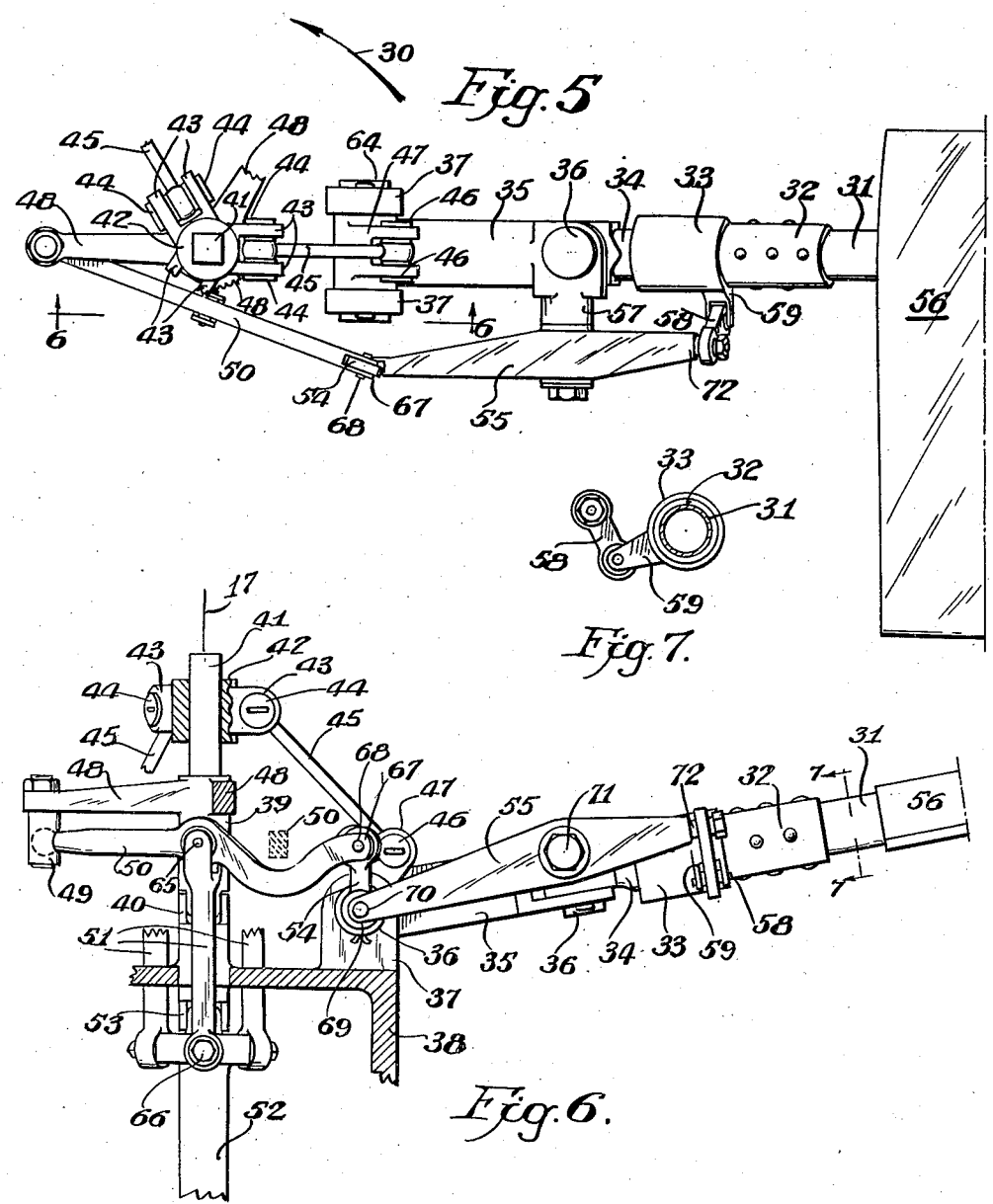

Patented Mar. 26, 1946

2,397,154

UNITED STATES PATENT OFFICE 2,397,154

ROTATIVE-WINGED AIRCRAFT

Haviland H. Platt, New York, N. Y., assignor to Rotary Research Corporation, Philadelphia, Pa., a corporation of Pennsylvania Application February 4, 1941, Serial No. 377,355

25 Claims. (Cl. 244—17)

The present invention relates to rotative-winged aircraft, namely aircraft of the type supported wholly or in part by one or more sustaining rotors, and more particularly to rotative-winged aircraft in which the rotors are articulated, that is, the blades of the rotors are hinged so as to flap, or swing freely in the vertical plane, and also pivoted so as to feather or rotate about their own axes. They may also be free to lag generally in the surface of rotation.

It is well known that rotor-supported aircraft have hitherto been deficient in stability. This has been due largely to the fact that the rotor blades, necessarily sweeping over a wide area, are extremely sensitive to air disturbances whether from external sources such as wind gusts, or self-generated as a result of their rapid motion through the air. Thus any component of horizontal velocity relative to the rotor causes an overturning tendency due to the increase in relative velocity of the blades when advancing toward the wind and the equal decrease in relative velocity when they are retreating from the wind. In the case of a rigid rotor the overturning tendency is transverse to the direction of the relative wind. In the case of an articulated rotor, on the other hand, the immediate effect is to cause the advancing blades to rise on account of the increased lift while at the same time the retreating blades descend because of the reduction of lift on them. The consequence is the well-known "flapping" of the blades. The result of this flapping is that the blades reach the highest point of their travel when passing the up-wind point in line with the relative wind and that they reach their lowest point diametrically opposite. Consequently the disc or cone swept by the blades is tilted away from the relative wind. Since the rotor is for practical reasons invariably mounted above the center of gravity of the aircraft, the tilt of the rotor disc causes a corresponding tilt of the entire aircraft away from the wind. The consequences of this effect are still further aggravated by the fact that the tilt of the rotor generates a horizontal thrust component causing the craft to accelerate rapidly away from the direction of the airflow. Thus, a combined tilting and slipping motion is developed which at best requires expert handling of the controls if the aircraft is to be maintained reasonably steady and in the desired place. The same applies to disturbances tending to cause deviation from any uniform flight path. For these reasons primarily, rotative-winged aircraft have been flown with any measure of success only by very expert pilots and even then have left much to be desired in the way of ease of handling and security against overturning.

One object of my invention is to overcome the adverse tilting tendencies by the use of means correlating flapping motions with feathering motions of the blades and thus to correct instability.

Another object is to provide a practical means of segregating or divorcing the cyclic rise and fall of the blades, known as "flapping" function or "flapping" ability from the simultaneous motion of all the blades together, known as "coning"; to the end that variations in one may be employed for producing automatic adjustments in rotor dynamics without deleterious influence to or from the other.

A further object of my invention is to reduce the amount of flapping and the resultant backward tilt of the cone which is developed in forward flight in order that forward flight may be maintained without inclining the aircraft forward to so great an angle as is otherwise necessary.

Still another object of my invention is to apply the novel stabilizing linkages and mechanisms of the present invention to rotors equipped with automatic pitch-regulating mechanism and cyclic pitch control mechanism, in such a way that the functions of each of the above instrumentalities remain unimpaired.

The principle underlying my invention is that of interconnecting flapping motions, that is, tilting displacements of the rotor disc as a whole, with the feathering control of the blades. Thereby an incipient disc tilt is caused to feather the blades; the maximum feathering angle occurring in any desired phase relationship around the revolution to the plane of the tilt. The feathering thereby causes altered distribution of lift around the revolution, and so in turn modifies the direction and amount of the resultant tilt.

The effects of tilt-feathering interconnection may be conveniently classified by resolving them in relation to two planes at right angles to each other; the first the longitudinal vertical plane in which the wind direction is contained, and the other the transverse plane.

When the disc tilt is interlinked with feathering control so as to produce a feathering maximum in the transverse plane, the resultant induced tilt is in the longitudinal plane, and consequently it directly amplifies or opposes the original tilt tendency. Thus, if the linkage is such as to produce a maximum on the advancing side of the rotation circle the induced tilt is away from the wind and the original tilt is aggravated.

On the other hand, if the arrangement is so disposed as to cause the pitch maximum to occur on the retreating side, the tilt resulting therefrom is against the original tendency, which is reduced thereby.

If the interlinkage is designed so as to produce the feathering maximum resulting from longitudinal tilt in the longitudinal plane the responsive tilt is in the transverse plane and can therefore have no effect in altering the amount of the original tilt component, but gives rise to an additional lateral component toward either side depending on the positioning of the pitch maximum toward or away from the wind. An invention utilizing this last effect is the subject of co-pending application Serial Number 377,354, filed February 4, 1941, in which the lateral tilt existing in forward flight is neutralized by the contrary lateral tilting tendency induced by an interlinkage which causes a feathering with maximum pitch position away from the wind.

When, as is usually the case, the longitudinal tilt is accompanied by a lateral component, combinations of the effects above described take place. In practice the transverse component of tilt is always toward the advancing side of the rotation circle. Consequently the direction of resultant tilt is into the rear advancing quadrant. Under these conditions, an interlinkage causing a feathering maximum ninety degrees rotationally earlier than the resultant tilt direction, induces a counter-tilt opposite to the original tilt, thus reducing directly the entire original resultant tilt. If the feathering maximum is, however, diametrically opposite the original resultant tilt, then the induced tilt tendency is toward the forward advancing quadrant. The longitudinal component of tilt is thus opposed while the transverse component of tilt is left unchanged. Since both of these two arrangements of the feathering maxima tend to neutralize the tilt component away from the relative wind, either one of them or any combination of them is available for effective rotor stabilization, the choice depending on considerations of mechanical convenience of the required linkage and on the type of design in which the rotor is to be incorporated.

It has been previously known in the art to interrelate flapping motions with feathering motions of rotor blades, an example being the angled flapping pivot. In all previous attempts to apply this principle, however, there is no differentiation between coning and flapping in causing feathering. That is, a large concerted feathering of all the blades takes place when they rise or fall in unison. Any interconnection of flapping and feathering which might otherwise have been useful, has for this reason given rise to cone responses which are prohibitive. This difficulty is completely overcome by my invention, which employs for the first time means for segregating flapping from coning to any desired degree, thereby making available the advantageous interlinkage of flapping and feathering.

In carrying out my invention I employ in general some sort of centering means attached to the rotor blades and maintaining, at all times, a mechanical member substantially central of the points of attachment to the blades, whatever position the blades may assume. Means mounted on the rotor hub are interposed between the centralized mechanical member and the pitch-changing mechanism of the blades so that pitch changes are caused to occur in response to horizontal relative displacement motions between the said centralized member and the rotor hub. Since the horizontal motions of the centralized member relative to the rotor hub reflect closely the tilt of the virtual rotation axis of the blades, substantially without response to, or uninfluenced by simultaneous (up or down) motions of all the blades, the changes of blade pitch take place in response to cone tilt or flapping and are substantially unaffected by general cone changes.

For the purpose of illustrating my invention, I have shown in the accompanying drawings specific forms thereof which are at present preferred by me, although it is to be understood that the essence of my invention may in practice be embodied in any of a wide variety of mechanical variations and equivalents, and that my invention is not limited to the precise construction herein shown and described.

Referring to the drawings in which like reference characters indicate like parts:

Figure 5 represents a more or less schematic, fragmentary plan view of a rotor embodying my invention, including stabilizer and automatic pitch-regulator and cyclic pitch-control means.

Figure 6 represents a side elevational view of the same, partly sectioned on line 6—6 of Figure 5.

Figure 7 represents a sectional view on line 7—7 of Figure 6.

Figure 1:
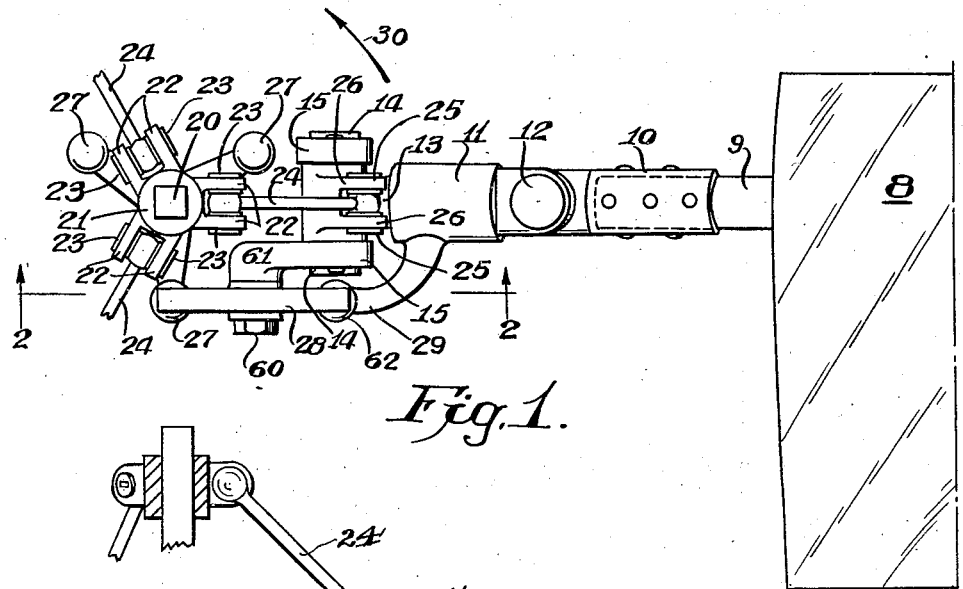
Figure 1 represents a more or less schematic fragmentary plan view of a rotor embodying one form of my novel stabilizer invention.
Figure 2A:
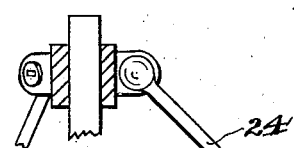
Figure 2a is a fragmentary elevational view partly in section of the rotor blade mounting.
Figure 2:
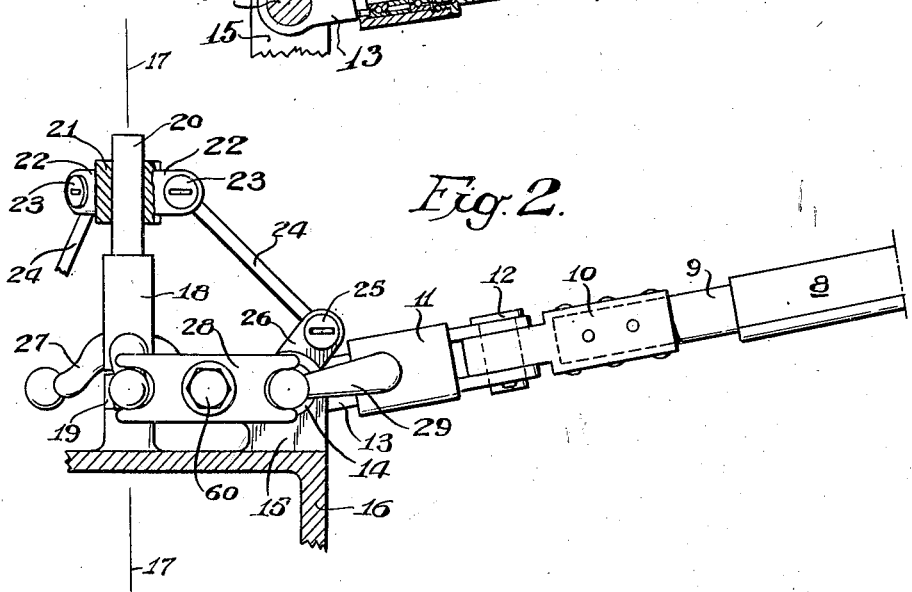
Figure 2 represents a side elevational view of the same, partly sectioned generally on line 2—2 of Figure 1.

The form of stabilizer in which a feathering maximum is caused to take place in a plane transverse to that of the tilt of the cone axis is illustrated particularly in Figures 1 and 2, which show schematically one blade, with its operating and stabilizing mechanism, of a three-bladed rotor; the showing of the two other similar blades being omitted for the sake of greater simplicity and clarity in illustrations; it being understood that the other two blades are similar and similarly related to and carried by the hub and similarly connected with the operating and stabilizing mechanism.

The airfoil rotor blade 8, shown broken away, is attached to the socket-like eye pivot fitting or member 10 by any suitable means such as the tubular spar 9 telescoped and snugly fitting into the outer hollow socket-like shank of the fitting 10, where it may be securely retained by transverse pins or rivets or by any other suitable means. The eye-fitting 10 is pivotally retained in the outer forked end of the bearing housing 11, by means of the pivot pin 12, which is held in place by any suitable means such as cotter pins, nuts or the like; the assembly of the eye-fitting 10 and the forked end of bearing housing 11 and the pin 12, comprising a generally upright or more or less vertical pivot allowing the blade 8 to swing freely to and fro in the surface of rotation within suitable limits; this to and fro motion about the pivot 12 being generally referred to as the "lag" motion. The bearing housing 11 is securely retained on the blade stub 13 through the intermediacy of suitable thrust and radial ball or roller bearings (not shown), so that the blade 8 is free to rotate generally about its axis or to "feather"; the actual "feathering" axis being determined by the axis of the bearings, which may be assumed to be the common axis of members 11 and 13. The stub 13 is bored out transversely at its inner end to accommodate the pivot 14 which serves to retain it in pivotal relationship to the lugs 15 which are formed integrally with the rotor head 16 (schematically shown and also shown broken away). The stub 13, lugs 15 and pin 14, thus comprise a generally horizontal pivotal attachment securing the blade 8 to the rotor hub 16 about a more or less horizontal pivot disposed transversely of the blade axis, while allowing it freedom to swing or "flap" generally in a plane passing through the axis of rotation 17 (although the "flapping" plane may deviate from the axis 17).

A post 18 is mounted substantially centrally of the rotation axis 17, being attached to the rotor hub 16 by means of a universal joint 19 of the carden cross type; the post 18 being thus free to tilt in any direction relative to the rotation axis 17 but being restrained from rotational displacement relative to the rotor hub 16. The upper end of the post 18 is formed as a guide 20, of square or other non-circular cross section. Slidably mounted on the guide 20 is a slide member 21, which is free to slide axially up and down on the guide 20 but not to rotate about it. The slide 21 may be slidably keyed to the post 18 by any other anti-rotational means. Formed integrally with the slide 21 are the pivot lugs 22, which are forked and bored to receive the spherically-seated bearing blocks 23, screwed into or otherwise securely retained in the forked lugs 22. Engaging with and pivotally retained between and by the bearing blocks 23 are the ball ended links 24, the outer ends of which are similarly retained in the similarly spherically-seated bearing blocks 25 in the lugs 26 formed integrally with the blades-stubs 13.

Formed integrally with the post 18, or otherwise fixedly secured thereto, are the ball-ended arms 27; the outer spherical ends of which extend into and operatively engage a slot in the inner end of lever 28 pivoted intermediate its ends. The levers 28 may be pivotally mounted on pivot-ends 60 of integral extensions or arms 61 of the adjacent lugs 15, and their outer ends are also similarly slotted to engage the spherical ends of the bent arms 29 formed integrally with or otherwise secured to the bearing housings 11; the centers of the ball-ends of the arms 29 being located in or closely adjacent to the extended axis of the pivot pins 14.

The rotor turns in operation in the direction of the arrow 30.

The rotor hub 16 may be mounted in suitable bearings (not shown) supported by any convenient type of aircraft structure, as for instance in a pylon structure extending from the fuselage. The hub may be mounted to rotate freely or to be driven by suitable gearing either in starting only, or in flight, depending on the nature of service to which the rotor is to be applied, such as helicopter or autorotative craft.

In operation a simultaneous and equal rise or fall of all the blades, usually designated as "coning," causes the slide 21 to rise or fall correspondingly through the simultaneous influence of all the links 24, without however causing the post 18 to be tilted or deflected from the position then occupied by it (or without tilting the post 18 away from its alignment with the rotation axis). When, however, the blades on one side of the rotor rise or fall relative to those on the other, designated as "flapping," the post 18 is tilted to one side and, when the "flapping" is uniformly cyclic, the post 18 takes up a steady position corresponding to the tilt of the axis of virtual rotation of the blades in their new state of motion. Thus no matter what may be the combination of "coning" and "flapping," the post 18 will segregate the one from the other by tilting in the azimuth of flapping through an angle generally proportional to the flapping angle while being entirely unresponsive to cone changes. A tilt of the post 18, in the plane transverse to that containing the axis of the blade 8 in the form of construction shown in Figures 1 and 2, causes the lever 27 to rise or fall, thus rocking lever 28 about its pivot 60, thereby raising or lowering arm 29 and thus providing a rotation of housing 11, with consequent change of pitch of blade 8. When the centers of the ball ends of levers 27 are in a plane passing through the center of tilt of the post 18, as shown, a tilt of post 18 in a plane containing the axis of the blade 8, however, causes no feathering rotation of the said blades in the position shown in Figure 1, but will cause a feathering maximum or minimum when that blade shall have reached a position ninety degrees rotationally later than the position shown, and the opposite minimum or maximum when it has progressed to the position 90° earlier than the position shown in Figure 1.

Complete independence of blade pitch from coning is attained only when the center of the ball end 62 of arm 29 lies in the axis or in the line of the axis of the flapping pivot 14. When lever 28 is rocked in response to flapping, the alignment is slightly disturbed. In practice, however, the displacements are comparatively small and the inaccuracy therefore negligible. When it is desired, as may in some designs be advantageous, to retain a small amount of pitch change in response to coning this purpose may readily be achieved by locating the ball end 62 of arm 29 out of the flapping axis in any desired direction, to a suitable extent. In this way not only may any desired amount of pitch response to flapping be retained, but the direction of such pitch change may be selected at will.

From the above description it is clear that in the construction shown in Figures 1 and 2 the interlinkage of flapping and feathering is such that the feathering maximum occurs substantially 90° behind the cone tilt direction. The blade pitch is thus increased above its mean value throughout the half revolution behind the tilt direction. The blade is thus caused to rise throughout this half revolution, attaining its highest position due to feathering at the position toward which the cone was originally tilted. The effect is therefore to reduce the original flapping. The rolling moment balance is, however, not impaired because the reduction in flapping is compensated for by an equivalent amount of feathering, balance being now achieved by a combination of feathering and flapping instead of by flapping alone. As previously explained, the rotor stability is thus greatly improved.

Figure 3:
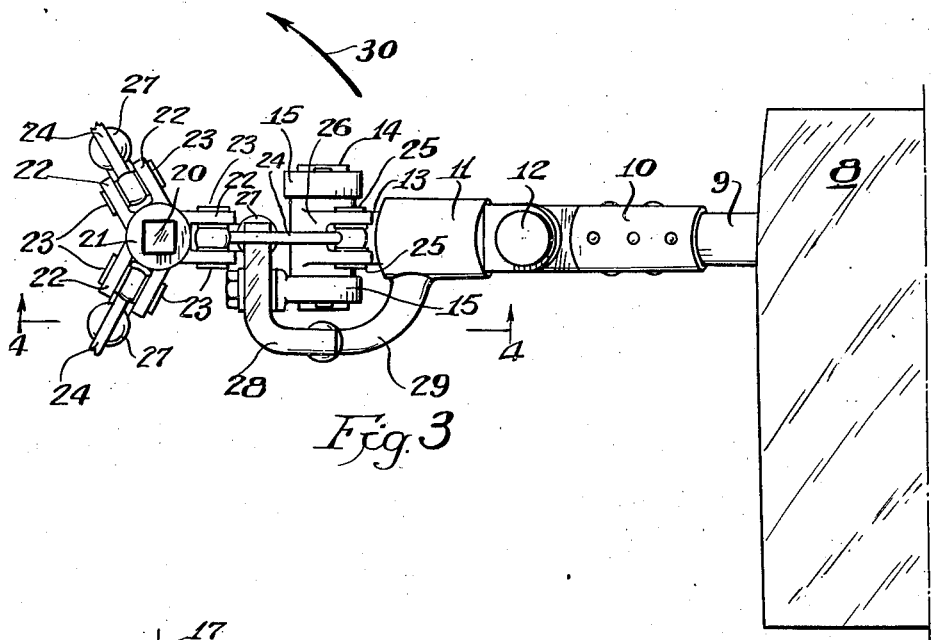
Figure 3 represents another schematic fragmentary plan view, similar to Figure 1, of the same rotor embodying a modified form of my novel stabilizer invention.
Figure 4:
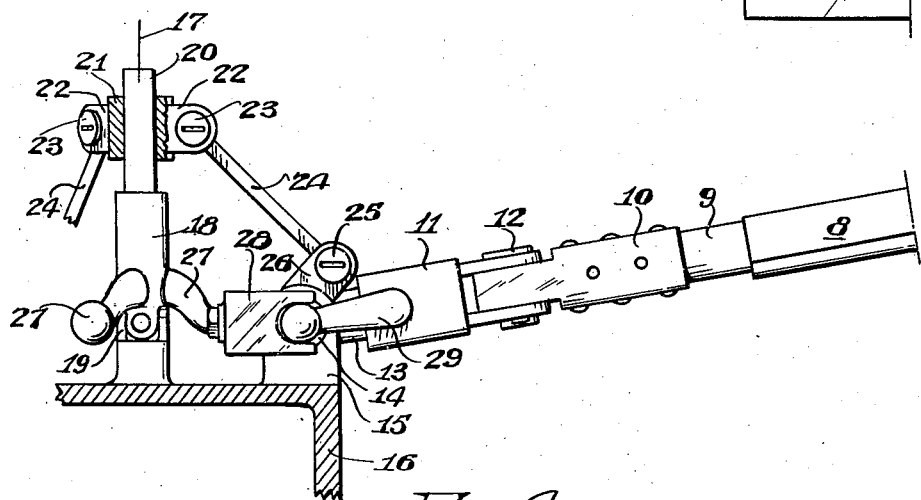
Figure 4 represents a side elevational view of the same, partly sectioned, generally on line 4—4 of Figure 3.

The form of my invention illustrated particularly in Figures 3 and 4 is identical with that of Figures 1 and 2, except for the disposition of the lever 28 and its co-operating parts; the lever 28 being bent through a right angle, and its pivot location on the lug 15 being correspondingly shifted and the ball ended arms 27 being rotated with relation to post 18 so as to cooperate with the inner formed ends of levers 28 in their changed positions. With this arrangement the interlinkage is such that the feathering maximum occurs substantially in the plane of the cone tilt and diametrically opposite thereto; the feathering inducing a cone tilt 90° rotationally later than the original tilt. The resultant tilt direction is therefore intermediate between the original and the induced tilt. Since in practice the tilt direction is always in the rear advancing quadrant relative to a wind, the resultant has a less longitudinal component than the original tilt and the effect is therefore stabilizing. The lateral component of tilt is unaffected. The practical result differs from that of the former arrangement only in that lateral flapping is unchanged while longitudinal flapping is more effectively suppressed. In fact, with the arrangement of Figures 3 and 4, longitudinal flapping may be entirely eliminated or even reversed, while with the arrangement of Figures 1 and 2, complete elimination of flapping is not possible. The arrangement of Figures 3 and 4 has therefore greater stabilization value, but may be objectionable due to the lateral flapping. When two rotors revolving in opposite directions are used, the lateral effects generally neutralize each other, thus eliminating this difficulty.

If the positions of levers 28 and 29 are reversed with relation to the axis of the blade 8 the induced tilt direction is 90° earlier than the original tilt, and the lateral flapping is reduced without changing the longitudinal flapping. With this change Figures 3 and 4 would differ from the drawings of my copending application above referred to, only in that they show an application to a three bladed rotor instead of a two bladed rotor. Any combination of the effects described above may be obtained by merely locating the arms 27 and the inner operative ends of levers 28 at an intermediate azimuth.

Figures 5, 6, and 7 illustrate particularly a form of construction embodying my invention adapted for power-driven rotors; including the interlinkage shown in Figures 3 and 4 and described above, in combination with means for rotor control by cyclic pitch variation and means for automatic regulation of the mean pitch. The rotor blade 56, shown broken away, is rigidly attached through its spar 31 and attachment sleeve 32 to the bearing housing 33, which is supported by suitable radial and thrust ball or roller bearings on the eye-fitting pivot member 34, so that the blade 56 is free to rotate or feather generally about its axis. The eye-fitting 34 is pivotally retained in the forked end of the link 35 by the pivot pin 36; the blade 56 being thereby given freedom to "lag" or swing in the surface of revolution. The inner (preferably enlarged) end of the link 35 is bored to receive the pivot pin 64, by means of which it is pivotally attached, through the lugs 37, to the rotor hub 38 (shown schematically and shown broken away); the blade 56 being thereby given freedom to flap or swing in a generally vertical or upright plane. A post 39 is mounted substantially centrally of the rotation axis, being attached to the rotor hub 38 by means of any suitable universal joint 40, which may be of the cardan cross type; the post 39 being thus free to tilt in any direction while being restrained from rotational displacement. The upper part of the post 39 is formed as a guide 41 of non-circular section or provided with any other anti-rotational keying means. Slidably mounted on the guide 41 is a slide member 42, which is free to slide axially on the guide 41 but not to rotate about it. Formed integrally with the slide 42 are the forked pivot lugs 43 which are bored to receive the spherically seated bearing blocks 44, screwed into or otherwise securely retained in the lugs 43. Engaging with and pivotally retained by the bearing blocks 44 are the ball-ended links 45; the outer ends of which are similarly retained in similar spherically seated bearing blocks 46 and the pairs of lugs 47 formed integrally with the links 35.

Formed integrally with the post 39, or otherwise secured thereto, are the arms 48 (one for each blade 56), to which are bolted or otherwise secured the spherical socket members or "ball-sockets" 49, universally retaining the ball-ends of levers 50, which levers 50 are bent so as to provide clearance for each other, as indicated by the other cross-sectioned lever 50 in Figure 6. The levers 50 are pivotally supported at 65 intermediate their ends, in the upper forked ends of control rods 51 which pass generally vertically through suitable slots or clearances in the rotor hub 38, as shown in Figure 6. The lower ends of the control rods 51 are pivotally attached at 66 to the top flange of a control lever 52 which is universally attached to the rotor hub 38 through the cardan cross universal joint 53 (or any other suitable universal connection). The control lever 52 (shown broken away) passes through the hollow spindle of the rotor head and engages suitable control means (not shown) whereby it may be held in any angularly displaced position.

The forked end 67 of the lever 50 is pivotally attached at 68 to the short link 54, which serves to connect it operatively to the inner end 69 of the lever 55 through the pivot 70; the pivot attachment 70 between link 54 and lever 55 having its center substantially in the extended axis of the flapping pivot pin 64, as indicated in Figure 5. Lever 55 is pivotally mounted at 71, on the lug or lugs 57 forming an integral or rigid portion of the outer end of the link 35. The outer end 72 of lever 55 is connected, by means of a self-aligning bearing or by means of a ball-and-socket joint, with one end of the link 58, the other end of which is similarly connected to the pitch arm 59 forming a rigidly operative part of the bearing housing 33.

When acting as a stabilizer, the construction shown in Figures 5, 6, and 7 functions identically with that of Figures 3 and 4; reversal of the position of the actuating arms 50 being necessitated merely by the introduction of the additional lever 55, in order to maintain the same direction of response. The operation of the control is as follows: When the control lever 52 is displaced in a plane normal to the axis of the blade 56, for example, the central pivot 65 of the lever 50 is raised or lowered; this motion being communicated through the train of links and levers (54, 55, 58 and 59) so as to increase or decrease the pitch of the blade 56. If the control lever 52 is maintained in a fixed displaced position as the rotor revolves, the pitch of all the blades undergoes a cyclic change of pitch with a maximum at one side of the rotation circle and a minimum at the other side. Thus the lift of the blades is greater at one side, causing them to flap and thus incline the direction of thrust in response to the direction of displacement of the lever 52, in accordance with the known principle of control by cyclic pitch variation.

The operation of the pitch regulator mechanism is as follows: When torque is applied to rotate the rotor, the aerodynamic resistance causes the blade 56 to lag about the pivot pin 36 until a position of equilibrium with the centrifugal restoring component is attained. The arm 59 is thus caused to move with the blade against the rotation direction 30, that is to the left in Figure 7. The end of lever 59 is constrained to follow an arcuate path by link 58 (about the pivot center 72). The blade pitch is thus increased during the first part of the lag, the rate of pitch-increase becoming less as the lag becomes greater. When the link 58 is vertical the pitch ceases to increase with further lag, and decreases as the link 58 moves to the left of the vertical (Figure 7). This sequence of pitch-lag response has been determined to be best adapted for the various phases of power and autorotative operation, as further set forth in my copending application above referred to.

The lag responsive automatic pitch regulation shown in Figures 5, 6 and 7 may be utilized without the superimposition of the manually operable control shown in these figures of the drawings. Thus, for instance instead of the links 51, similar supports may be provided rigidly carried by the hub and without any capacity for raising and lowering the pivot points 65. However, if the manual control through the members 52 and 53 is not desired, then the links 50 and 51 may be entirely eliminated together with the intervening pivots 65, by merely connecting an arm 48 on the same side as the blade with the upper end of the link 54, thereby eliminating the links 50 and 51 and the ball and socket joint 49, and nevertheless retaining the same functions as that present in the structure shown in Figures 5, 6 and 7, without, however, the manual control members 52 and 53.

While, for purposes of illustration, I have shown a type of centralizing device employing a tiltable guide rod, a slide thereon and angled link connections to the blades, a variety of other actuating means may be substituted without departing from the essence of my invention, such as a floating central member with spring attachments, or a tiltable member with spring or other resilient centralizing means. Furthermore the levers, bearings, pivots and links may take any of the wide variety of mechanical forms and dispositions known in the art without departing from the essential attributes of my invention. I therefore desire the present embodiments to be considered in all respects as illustrative and not restrictive, reference being had to the appended claims rather than to the foregoing description, to indicate the scope of the invention.

Having thus described the invention, what is hereby claimed as new and desired to be secured by Letters Patent is:

1. An aircraft lift rotor including a plurality of airfoil blades, hinge means permitting up-and-down swinging motion of said blades, pitch-varying pivot means permitting pitch-varying rotation of each blade about an axis disposed generally longitudinally of the blade, and means interconnecting the up-and-down swinging and pitch-varying rotational displacements of the blades such that simultaneous like up-or-down swinging displacements of all of said blades cause relatively little pitch-varying rotational displacements of any of the blades but that differential up-or-down swinging displacements between the blades cause pitch-varying rotational displacements of one or more of the said blades.

2. An airscrew including a hub, a plurality of airfoil blades pivotally secured to said hub so as to permit flapping and pitch-varying displacements of said blades in relation to said hub, a guide member pivotally mounted on said hub, a slide on said guide member, means correlating the displacement of said slide with the flapping displacements of said blades and means correlating the displacement of said guide member with the pitch-varying displacements of said blades.

3. An aircraft lift rotor including a hub, a plurality of airfoil blades, hinge means permitting up-and-down swinging motion of said blades and to-and-fro motion of the blades relative to the hub in the surface of rotation of the blades, pitch-varying pivot means permitting pitch-varying rotation of each blade about an axis disposed generally longitudinally of the blade, means interconnecting the up-and-down swinging and pitch-varying rotational displacements of the blades such that simultaneous like up or down swinging displacements of all of said blades cause relatively little pitch-varying rotational displacements of any of the blades but that differential up or down swinging displacements between the blades cause pitch-varying rotational displacements of one or more of the said blades, and connecting means correlating the to-and-fro displacements of the blades with the pitch-varying displacements of the blades.

4. An aircraft lift rotor including a hub, a plurality of airfoil blades, hinge means permitting up-and-down swinging motion of said blades and to-and-fro motion of the blades relative to the hub in the surface of rotation of the blades, pitch-varying pivot means permitting pitch-varying rotation of each blade about an axis disposed generally longitudinally of the blade, means interconnecting the up-and-down swinging and pitch-varying rotational displacements of the blades such that simultaneous like up or down swinging displacements of all of said blades cause relatively little pitch-varying rotational displacements of any of the blades but that differential up or down swinging displacements between the blades cause pitch-varying rotational displacements of one or more of the said blades, connecting means correlating the to-and-fro displacements of the blades with the pitch-varying displacements of the blades, and control means operable by the pilot for differentially changing the pitch of the blades on opposite sides of their path of travel about the rotor axis.

5. An aircraft lift rotor including a rotor hub, a plurality of blades pivoted thereto for flapping, feathering and lagging, a transversely movable centering member, means interlinking said centering member with the flapping motion of the blades, means interlinking the transverse motion of the centering member with the feathering motion of the blades, and connecting means correlating lagging displacements of the blades with feathering displacements thereof.

6. An aircraft lift rotor including a rotor hub, a plurality of blades pivoted thereto for flapping, feathering and lagging, a transversely movable centering member, means interlinking said centering member with the flapping motion of the blades, means interlinking the transverse motion of the centering member with the feathering motion of the blades, connecting means correlating lagging displacements of the blades with feathering displacements thereof, and control means operable by the pilot for differentially changing the pitch of the blades on opposite sides of their path of travel about the rotor axis.

7. An aircraft lift rotor including a rotor hub, a plurality of blades pivoted thereto for flapping, feathering and lagging, a transversely movable centering member so interlinked with said blades that it is displaced generally transversely by differential flapping motions of the blades, means interlinking transverse displacements of the centering member with feathering displacements of the blades, and connecting means correlating lagging displacements of the blades with feathering displacements thereof.

8. An aircraft lift rotor including a rotor hub, a plurality of blades pivoted thereto for flapping, feathering and lagging, a transversely movable centering member so interlinked with said blades that it is displaced generally transversely by differential flapping motions of the blades, means interlinking transverse displacements of the centering member with feathering displacements of the blades, connecting means correlating lagging displacements of the blades with feathering displacements thereof, and control means operable by the pilot for differentially changing the pitch of the blades on opposite sides of their path of travel about the rotor axis.

9. An airscrew including a hub, a plurality of airfoil blades pivotally secured to said hub so as to permit flapping and pitch-varying displacements of said blades in relation to said hub and to permit lagging displacements of said blades, means correlating the tilting displacement relative to the hub of the surface swept by the said blades in their rotation with the pitch-varying displacements of said blades; substantially without effect of changes in the form of the said surface on pitch-varying displacements, and connecting means correlating lagging displacements of the blades with the pitch-varying displacements thereof.

10. An airscrew including a hub, a plurality of airfoil blades pivotally secured to said hub so as to permit flapping and pitch-varying displacements of said blades in relation to said hub and to permit lagging displacements of said blades, means correlating the tilting displacement relative to the hub of the surface swept by the said blades in their rotation with the pitch-varying displacements of said blades; substantially without effect of changes in the form of the said surface on pitch-varying displacements, connecting means correlating lagging displacements of the blades with the pitch-varying displacements thereof, and control means operable by the pilot for differentially changing the pitch of the blades on opposite sides of their path of travel about the rotor axis.

11. An aircraft lift rotor including a rotor hub, a plurality of blades pivoted thereto for flapping and feathering, a freely tiltable centering member mounted on said hub, means positioning said centering member by the flapping motion of the blades, and means interlinking the centering member with the blades, said interlinking means feathering said blades in response to the position of said centering member.

12. An aircraft lift rotor including a rotor hub, a plurality of blades pivoted thereto for flapping and feathering, a freely movable centering member, positioning means interlinking said centering member with said blades for positioning said centering member in response to the flapping motions of the blades, and means interlinking said centering member with the blades to cause feathering displacements of said blades in accordance with the change of position of said centering member.

13. An aircraft rotor including a rotor hub, a plurality of blades pivoted thereto for flapping and feathering, a transversely movable centering member, positioning means interlinking said centering member with said blades for positioning said centering member by the response to the flapping motions of the blades, and means interconnecting said centering member and said blades to cause feathering displacements of said blades in accordance with the changes of position of said centering member.

14. An aircraft rotor including a rotor hub, a plurality of blades pivoted thereto for flapping and feathering, a freely movable centering member, means for moving said centering member responsive to the flapping motion of said blades, and means for feathering said blades responsive to the movement of said centering member.

15. A stabilizing device for articulated aircraft rotors comprising a hub, a plurality of airfoil blades pivoted to said hub for flapping and feathering, and means including a freely movable centering member adapted to be moved by the flapping motions of said blades for feathering said blades responsive to the flapping motion thereof.

16. An aircraft rotor having a hub, a plurality of airfoil blades pivotally secured to said hub and adapted to permit flapping and pitch-varying displacements of said blades in relation to said hub, and means interlinking said flapping and pitch-varying displacements, said means including a freely movable centering member, positioning means interlinking said centering member with said blades for positioning said centering member responsive to the flapping displacements of said blades, and means interlinking said centering member with said blades for causing pitch-varying displacements thereof responsive to change in position of said centering member.

17. An airscrew including a hub, a plurality of airfoil blades pivotally secured to said hub and adapted to permit flapping and pitch-varying displacements of said blades in relation to said hub, and means for correlating the flapping and pitch-varying displacements of said blades, said means including a freely flexible member, means for moving said member responsive to the flapping displacements of said blades, and means for producing pitch-varying displacements of said blades responsive to movements of said flexible member.

18. An airscrew including a hub, a plurality of airfoil blades pivotally secured to said hub and adapted to permit flapping and pitch-varying displacements of said blades in relation to said hub, and means for inter-relating the flapping and pitch-varying displacements of said blades, said means including a freely movable member connected in common to two or more of said blades and adapted to move in response to their combined flapping displacements, and means for changing the pitch-varying displacements of said blades responsive to movements of said movable member.

19. An airscrew including a hub, a plurality of airfoil blades pivotally secured to said hub and adapted to permit flapping and pitch-varying displacements of said blades in relation to said hub, and means for inter-relating the flapping and pitch-varying displacements of said blades, said means including a freely tiltable member connected to two or more of said blades and adapted to be displaced in response to the combined flapping displacements of said blades, and means interlinking said tiltable member with the blades for producing pitch-varying displacements of said blades responsive to the transverse component of the displacement of said tiltable member.

20. An airscrew including a hub, a plurality of airfoil blades pivotally secured to said hub and adapted to permit flapping and pitch-varying displacements of said blades in relation to said hub, and means for inter-relating the flapping and pitch-varying displacements of said blades, said means including a freely movable centering member connected to said blades and adapted to be tiltably moved responsive to flapping of said blades, and means interlinking said movable member with said blades whereby pitch-varying displacements of said blades are produced only by the transverse component of the movement of said movable member.

21. An airscrew including a hub, a plurality of airfoil blades pivotally secured to said hub and adapted to permit flapping and feathering displacements of said blades in relation to said hub, and means correlating the feathering displacements with the differential flapping displacements of said blades but substantially not with their like flapping displacements, said correlating means including a freely movable centering member, means for tiltably moving said centering member responsive to the flapping displacements of said blades, and means interlinking said centering member with said blades whereby only the transverse component of the movement of said centering member produces feathering displacements of said blades.

22. An airscrew including a hub, a plurality of airfoil blades pivotally secured to said hub and adapted to permit flapping and feathering displacements of said blades in relation to said hub, and means correlating the feathering displacements with the flapping displacements of said blades whereby the feathering effect produced by differential flapping displacements of the blades is different from that produced by like flapping displacements of said blades, said correlating means including a freely movable centering member, means for tiltably moving said centering member responsive to the flapping displacements of said blades, and means interlinking said centering member with said blades whereby only the transverse component of the movement of said centering member produces feathering displacements of said blades.

23. An aircraft lift rotor including a hub, a plurality of airfoil blades, hinge means permitting up-and-down swinging motion of said blades, pitch-varying pivot means permitting pitch-varying rotation of each blade about an axis disposed longitudinally of the blade, control means operable by the pilot for differentially changing the pitch of the blades on opposite sides of their path of travel about the rotor axis, and means for producing pitch-varying rotational displacements of said blades upon differential swinging displacements of said blades while causing relatively little pitch-varying rotational displacements upon simultaneous like swinging displacements of said blades, said means including a freely movable centering member, means for tiltably moving said centering member responsive to the flapping displacements of said blades, and means interlinking said centering member with said blades whereby only the transverse component of the movement of said centering member produces feathering displacements of said blades.

24. An aircraft lift rotor including a rotor hub, a plurality of blades pivoted thereto for flapping and feathering, control means operable by the pilot for differentially changing the pitch of the blades on opposite sides of their path of travel about their rotor axis, a freely movable centering member, positioning means interlinking said centering member with said blades for positioning said member responsive to the flapping motions of said blades, and means interlinking said centering member with said blades for causing feathering displacements of said blades in response to the position of said centering member.

25. An aircraft lift rotor including a rotor hub, a plurality of blades pivoted thereto for flapping and feathering, control means operable by the pilot for differentially changing the pitch of the blades on opposite sides of their path of travel about the rotor axis, a freely tiltable centering member, means interlinking said centering member with said blades whereby said centering member is displaced generally transversely by differential flapping motions of said blades, and means interlinking said centering member with said blades for causing feathering displacements of said blades responsive to transverse displacements of said centering member.

HAVILAND H. PLATT.